United States Patent [19]

Kupcikevicius et al.

[11] 3,860,996

[45] Jan. 21, 1975

[54] STUFFING METHOD AND APPARATUS

[75] Inventors: Vytautas Kupcikevicius; Joseph A. Nausedas, both of Chicago, Ill.

[73] Assignee: Union Carbide Corporation, New York, N.Y.

[22] Filed: Jan. 19, 1973

[21] Appl. No.: 325,211

[52] U.S. Cl. .................................................. 17/49
[51] Int. Cl. .......................................... A22c 13/00
[58] Field of Search ...................... 17/35, 49, 39, 41

[56] References Cited
UNITED STATES PATENTS
3,621,513  11/1971  Kupcikevicius ......................... 17/35
3,731,346  5/1973  Kupcikevicius ......................... 17/49

*Primary Examiner*—Robert Peshock
*Attorney, Agent, or Firm*—Maurice W. Ryan

[57] ABSTRACT

Viscous food product such as ground fresh meat is stuffed into tubular plastic film packaging bags through a stuffing horn disposed longitudinally concentrically of the bag being filled, the product flow is stoppered when the bag is filled to the desired extent by a stopper disposed to move concentrically reciprocally in the stuffing horn, the filled bag is advanced forward of the stoppered stuffing horn to a position where a necked-down product-free portion of the bag interior adjacent its open end is in registration with a bag closing-clipping means and the filled bag is closed and clipped sealed at the neck.

3 Claims, 4 Drawing Figures

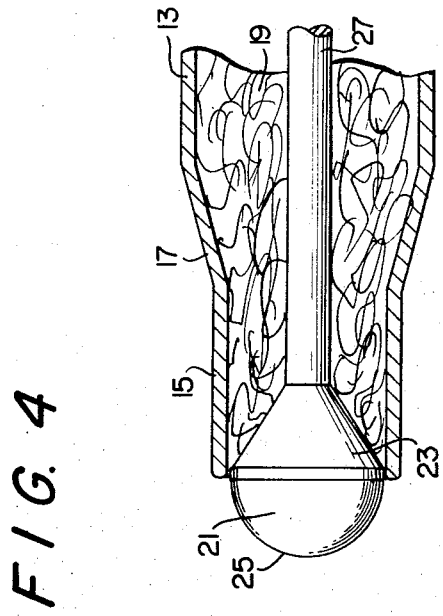
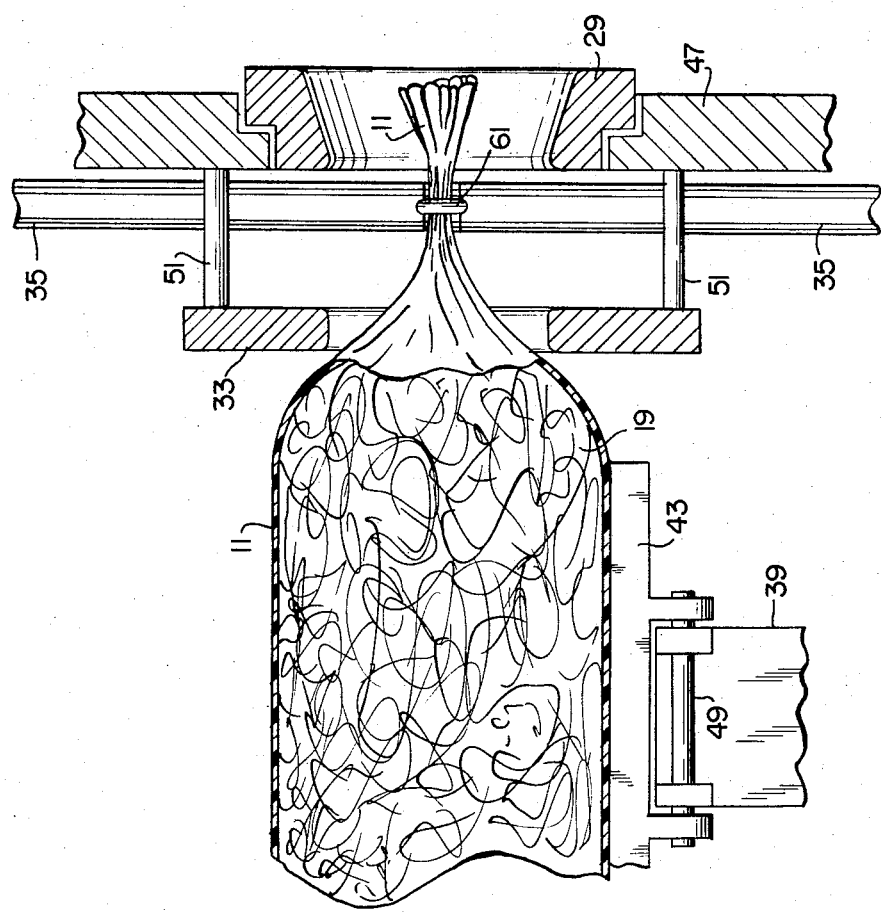
FIG. 4

STUFFING METHOD AND APPARATUS

This invention relates to a food stuffing apparatus and method, particularly to a method and apparatus for constricting and compacting a food-free portion of bag or casing interior which has just been filled to the desired extent with viscous food product and advanced forward and clear of the stuffing mechanism, to facilitate the application of a closure clip to seal the open or last filled end of the bag, and the more particularly to such a method and apparatus as is uniquely suitable for use in cold rooms in the meat packaging industry.

In meat sausage production, techniques for the automatic and semiautomatic filling of sausage casings generally comprehend the extrusion and extension of a shirred continuous film casing length or a shirred or pleated film bag which has been placed over a stuffing horn with viscous meat emulsion fed under pressure through the stuffing horn and into the bag or casing interior. In this discussion the term "bag" will be used throughout but is intended to mean continuous tubular casing lengths as well such as those known to persons conversant with the art in the production of unit size packages of particulate viscous food, ground fresh meats for example. The materials from which the bags discussed herein are manufactured are typically clear plastic films of polyolefins, but may be of cellulose or any other suitable material.

Several satisfactory methods and apparatus are available to the industry for sausage production in the smaller sizes, frankfurters particularly, and also for large casing stuffing to produce bologna, salami, liverwurst and the like products. Generally these processes are worked in areas maintained at or near normal interior room temperatures and function well in such conditions. If, for one reason or another, the process ambient temperature or the temperature of the product emulsion is lowered, it is not lowered to freezing levels. Fresh meat processing however is conducted in cold rooms where ambient temperatures are maintained at or near freezing to insure meat freshness. Fresh meat in packaging process generally has not had the preservatives added which would permit handling at higher temperatures.

In attempting to adapt presently available viscous food stuffing technology to cold room operations, typically continual semiautomatic bagging of ground fresh meats, problems have been encountered. Methods and apparatus which work satisfactorily at or near normal room temperatures are found to produce less than satisfactory results in cold rooms. The U.S. Pat. No. 3,553,769 to Myles et al. and U.S. Pat. No. 3,621,513 to Kupcikevicius, assigned to the same assignee as this patent, illustrate the stuffing technology under discussion. The major problems encountered are attributable to the effect of the lower temperatures of the cold room on the packaging bags used. Bags which are soft and pliable and easily handled through end closure and clipping steps in room temperature processes become relatively stiff and brittle and tend to crack and tear during the performance of these same operations in cold rooms. Cold room stuffing of fresh ground meat also involves a product which is significantly more viscous and rather particulate in form and thus quite a bit different in character from the smooth easy flowing emulsions normally encountered in conventional sausage stuffing. Thus it has been found difficult with known techniques to obtain good clean product-free closure zones where sealing clips can be applied adjacent the open ends of just filled bags.

With this being the state of the art, the present invention was conceived and developed to provide an automatic or semiautomatic technique for cold room stuffing of flexible bags with viscous food product.

The invention also provides a technique particularly suitable for cold room stuffing of flexible plastic film bags with ground fresh meat.

Another and significant advance in the art provided by the present invention is a novel apparatus and method improvement which insures bag closure at a product-free portion of a just-filled bag interior.

These and other advantages and features of the present invention will become the more readily apparent from the ensuing description and from the drawings wherein:

FIG. 3 shows the apparatus with the just filled bag advanced forward of the stuffing horn with its neck in registration with a closure means and FIG. 4 shows the apparatus effecting the closure of the just filled bag.

Figure 1:
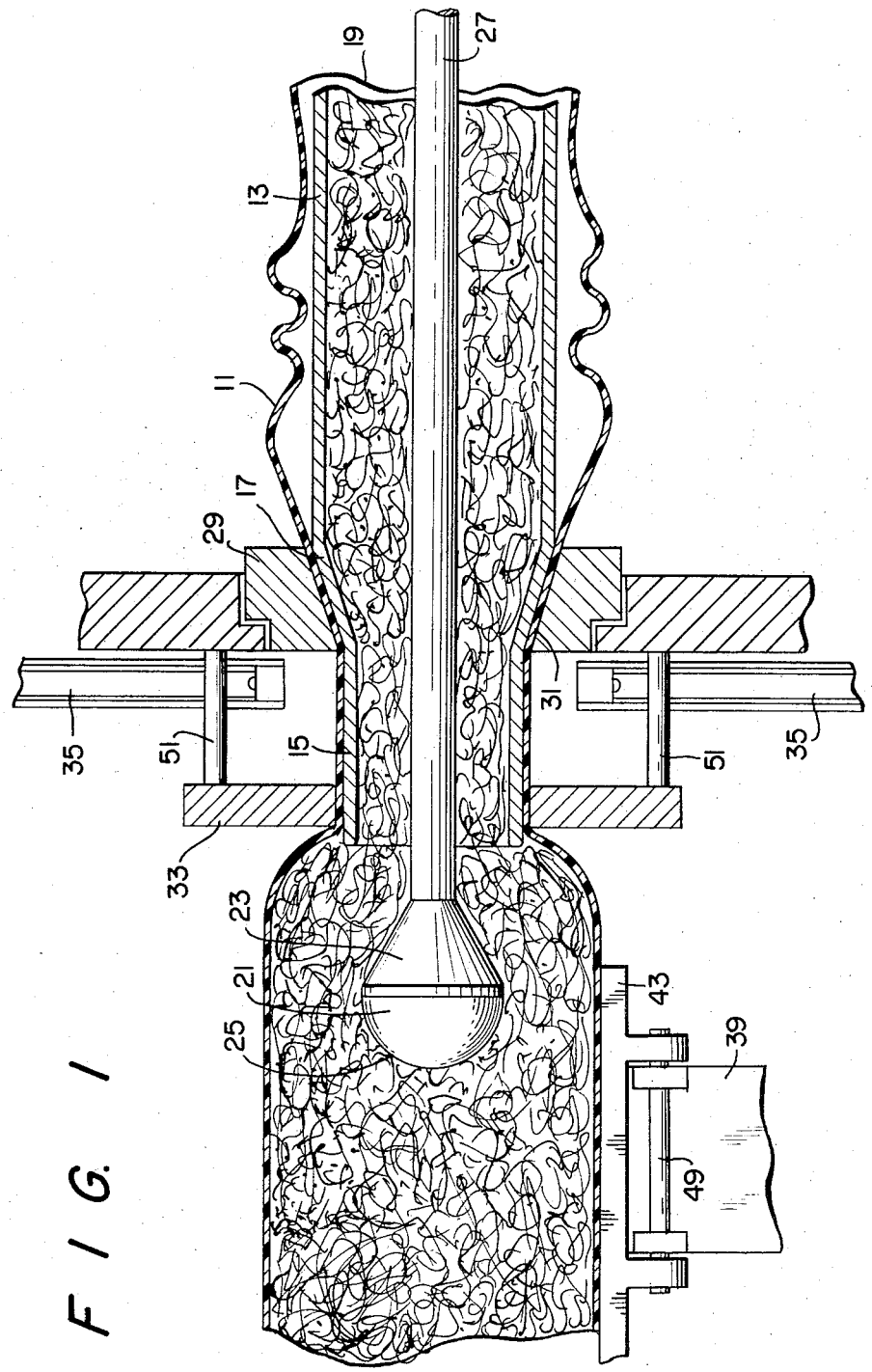
FIG. 1 is a sectional view through apparatus according to the invention showing a bag on a stuffing machine and in the process of being filled.

In general the present invention comprehends, in apparatus for continually stuffing product into flexible packaging bags wherein the product is pressure fed into each bag sequentially through a stuffing horn disposed during stuffing into the bag through its open end, the improvement comprising, in combination, a stuffing horn outlet having a peripheral dimension less than the peripheral dimension of the stuffed bag; a truncated conical section disposed between and connecting the stuffing horn and the stuffing horn outlet; an annulus disposed concentrically on said truncated conical section arranged to define a truncated conical passage through which the bag being stuffed advances in slipping movement from the stuffing horn towards the stuffing horn outlet; product stoppering means disposed longitudinally concentrically in the stuffing horn, having a peripheral dimension not greater than the peripheral dimension of the stuffing horn outlet, reciprocally moveable between a first position in which product stuffing flow proceeds through the stuffing horn, the stuffing horn outlet, and around the stoppering means into the bag and a second position in which product stuffing flow is stopped at the stuffing horn outlet; means to move said stoppering means selectably between and into said first and said second positions; bag restraining means disposed concentrically of the stuffing horn adjacent the stuffing horn outlet arranged to hold the bag being stuffed in slipping contact against the stuffing horn outlet periphery; bracket means mounting the annulus, the bag restraining means, and a support for the bag being stuffed, and motive means operably connected to and arranged and disposed to move said bracket means reciprocally between a first position in which an unfilled product-free interior adjacent the open end of a just filled bag is in communication with the outer periphery of the stuffing horn outlet and a second position in which said unfilled product-free interior adjacent the open end of a just filled bag is advanced into registration with bag neck closure and sealing means clear of the stuffing horn outlet and the product stoppering means.

In a particular embodiment of apparatus according to the invention, bag neck closure and sealing means is disposed substantially concentrically of and between the annulus and the bag restraining means and is mounted on the moveable bracket means to move with these components.

The methods for continually making substantially alike package articles of viscous product snugly encased and sealed in flexible packaging bags may be described as comprising the step of disposing a bag on a stuffing horn, stuffing the bag with product pressure fed through the stuffing horn at a stuffing flow cross sectional area less than the cross sectional area of the package articles while permitting the bag as it fills with product to advance incompletely off the stuffing horn in slipping movement maintained against the stuffing horn periphery; stopping the flow of pressure fed product into the bag before the bag is completely filled and while an unfilled product-free portion of the bag adjacent its open end is in communication with the stuffing horn; advancing the bag clear of the stuffing horn to a position wherein its unfilled product-free portion adjacent its open end is in registration for the bag neck closure and sealing; closing the bag neck; sealing the bag closed neck; removing the package article; and repeating the steps aforedescribed.

With reference to the drawings, a stuffing apparatus improvement according to the present invention is illustrated showing a flexible plastic film packaging bag 11 in place in FIG. 1 on a stuffing horn 13 in the course of a stuffing step. Stuffing horn 13 is formed with an outlet 15 which is of a peripheral dimension less than the peripheral dimension of the stuffed bag as shown to the left in each of the drawings. A truncated conical section 17 is disposed between and connects stuffing horn 13 and its outlet 15. Preceding each stuffing operation, a fresh empty bag 11 is slipped over the outlet 15 of the stuffing horn until the outlet bottoms on the closed end of the bag and the bag material is pleated up as shown on the main body of the stuffing horn from which it advances towards the left in the drawings as product 19 is pressure fed into it through the horn and its outlet. A stopper 21 having a conically tapered rear surface 23 and a rounded front surface 25 is attached to the end of an actuating rod 27, this assembly being disposed longitudinally concentrically in the stuffing horn. The overall periphery of the stopper 21 is not greater than the outer peripheral dimension of the stuffing horn outlet 15 but great enough to effect tight closure of the outlet 15 and stop product stuffing flow when indexed to do so as shown in FIG. 2.

An annular element 29 is disposed concentrically on the stuffing horn at the truncated conical section 17 and has an interior bore surface which is truncated conical in shape to approximate the surface of section 17 so as to define a truncated conical passage 31 through which the bag 11 advances in slipping movement as it is being stuffed. A bag restraining element 33 is disposed adjacent and concentrically of the terminus of outlet 15 and loosely urges the bag being stuffed against the outer surface of the stuffing horn outlet 15 snugly enough to prevent product backflow along the outer surface of the stuffing horn.

A bag neck closure apparatus 35 is disposed substantially concentrically of and between annular element 29 and the bag restraining element 33.

Figure 2:
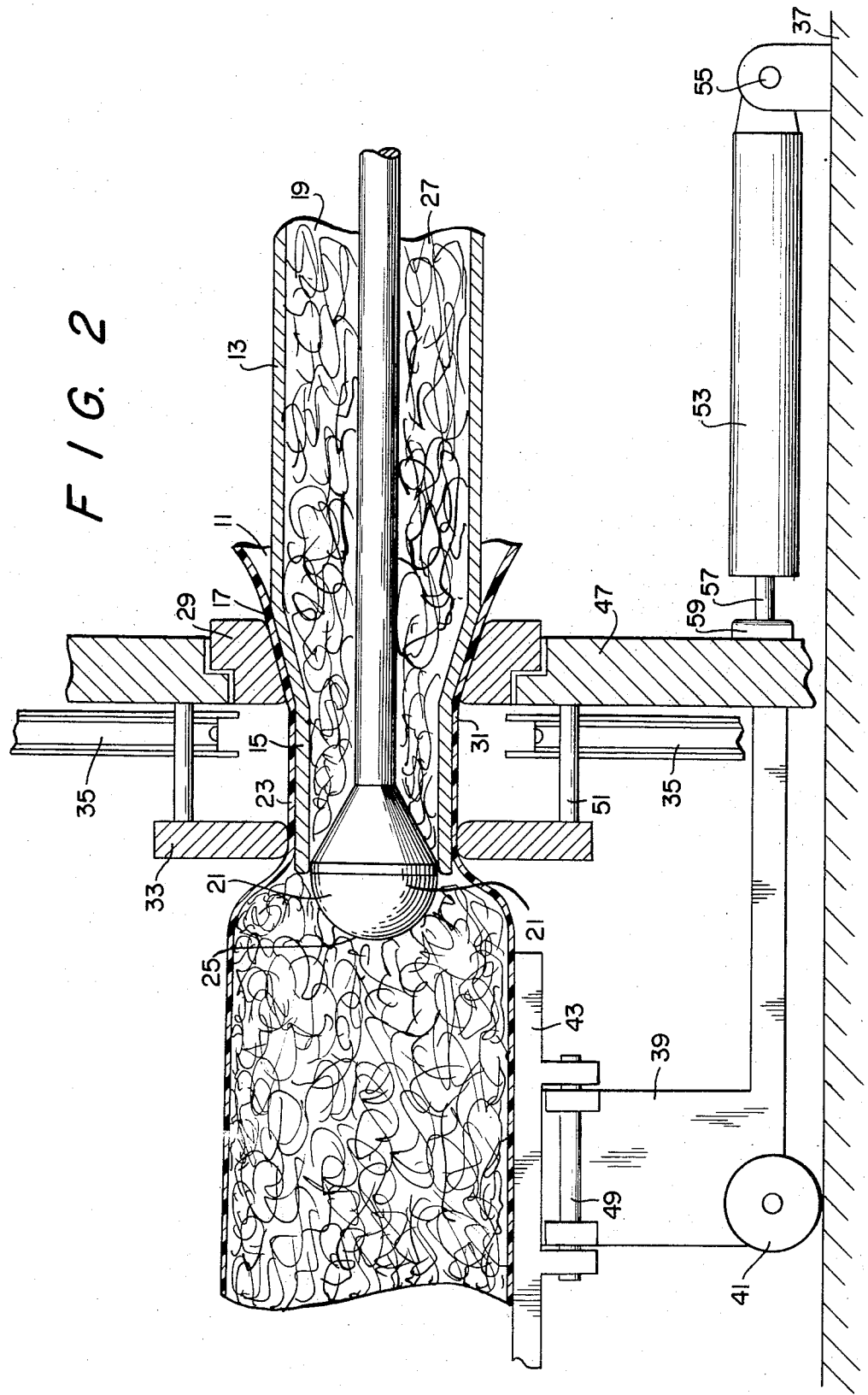
FIG. 2 shows the apparatus of FIG. 1 with the filling step completed and the product flow stopped.
Figure 3:
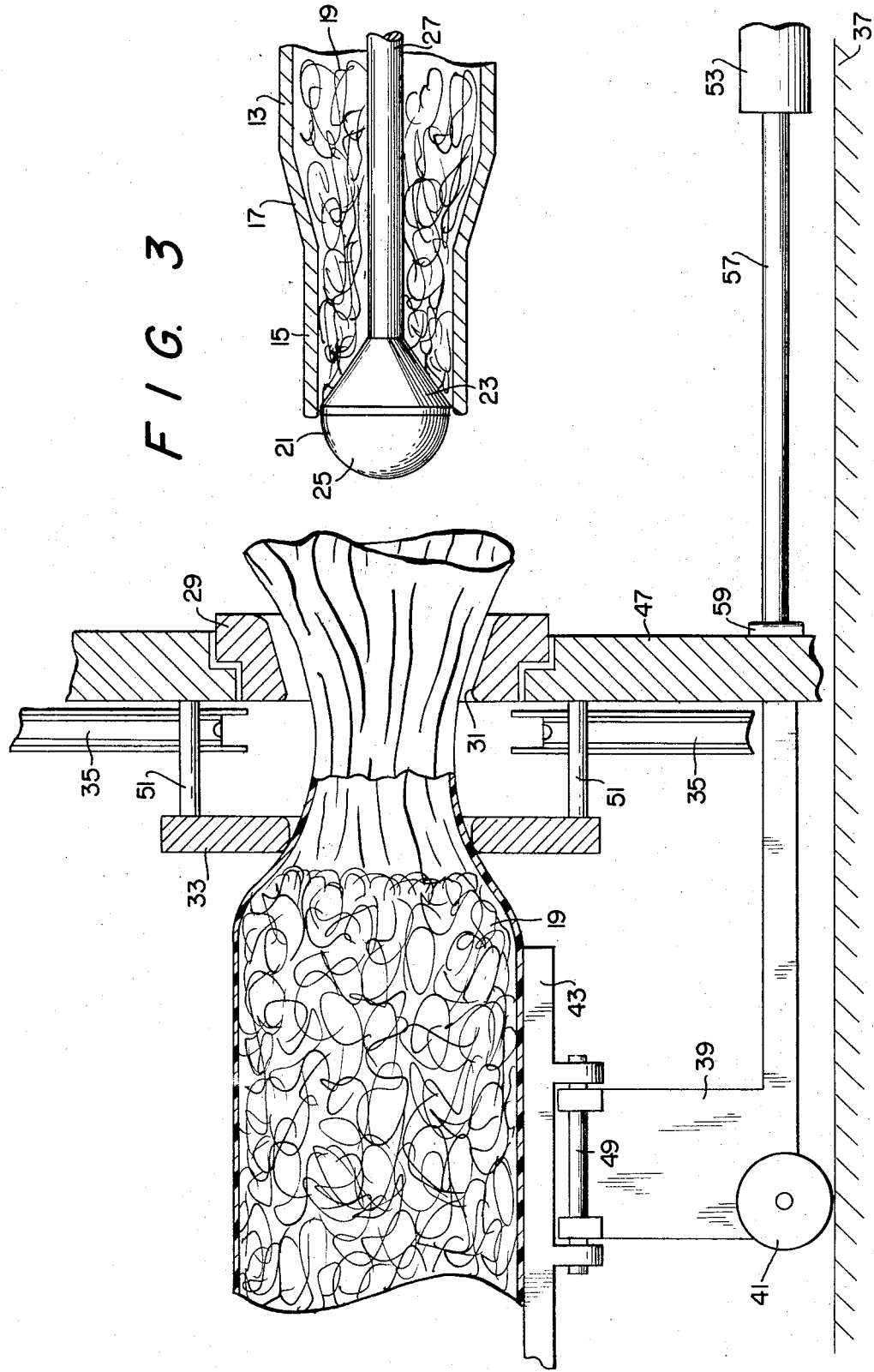

FIGS. 2 and 3 show a bracket-carriage assembly arranged and disposed to move reciprocally longitudinally parallel with the product flow line on the apparatus bed 37 and comprises a carriage 39, mounting a roller 41, a package article support 43, and an upright bracket 47. The package article support 43 is secured to carriage 39 by any suitable means such as a holding pin journal assembly 49 connecting the underside of the support 43 to the upper forward portion of the carriage. The upright bracket 47 is fixedly attached at the rear of carriage 39 and constitutes the main structural support for the annular element 29 and the bag restraining element 33 which is attached to the bracket as shown with rods 51. Motive means for the bracket-carriage assembly may comprise an actuating cylinder 53 attached to bed 37 by means of a clevis 55 and having an actuating shaft 57 attached to the bracket 47 rear by a connector 59.

The operation of the illustrated apparatus according to the invention is shown sequentially in the drawing FIGS. 1, 2, 3 and 4.

In FIG. 1, a stuffing operation is in process and a partially filled bag is shown as it advances under the product stuffing flow pressure from its pleated up condition on the stuffing horn 13, through conical passage 31, over the outer peripheral surface of stuffing horn outlet 15 and out through the bag restraining element 33 into its fully expanded filled condition as shown at the left of the drawing. The bag is thus advanced by the pressurized product stuffing flow which proceeds from the right in the drawing through the stuffing horn, conical section 17, the stuffing horn outlet 15 and on into the bag around the stopper 21. Product 19 is fed into the stuffing horn by any of several techniques familiar to persons conversant with the art.

FIG. 2 shows the actuating rod 27 and attached stopper 21 indexed to the second position in which the stopper cuts off product flow at the stuffing horn outlet. In FIG. 2, the bag 11 has been filled with product to a desired preselected extent and has advanced to a condition wherein its open end is positioned just outside entry into the passage 31. In the FIG. 2 condition the bag now has an unfilled product-free interior zone adjacent its open end and extending therefrom towards the filled bag zone to the location of the bag restraining element 33. The filled bag is now ready to be advanced free of the stuffing horn outlet and its stopper 21 to be closed and sealed.

In FIG. 3, the cylinder 53 has been actuated by for instance hydraulic or pneumatic pressure, extending cylinder shaft 57, and the bracket-carriage assembly hereinabove described, towards the left in the drawings into the second position wherein the unfilled product-free interior adjacent the open end of the just filled bag is advanced clear of the stuffing horn outlet and the stopper 21 and is in a position where the bag closure apparatus can be actuated to completely neck down the bag adjacent its open end and make ready for the application of a neck closure clip. In this operation, it should be noted, the bag restraining element 33 acts in its advance as a ported product ram bearing against the shouldered portions of the just filled bag and pushing annularly against the product through the bag film. This function also eliminates any tendency the product might otherwise have to backflow into the unfilled product-free interior adjacent the bag open end.

FIG. 4 of the drawings shows the illustrated embodiment in the same condition as in FIG. 3 but with the bag closure apparatus 35 now actuated and a sealing clip 61 in place on the constricted neck of the bag. Here it should be noted that the bag closure apparatus 35 and the related means to apply the clip 61 may be either mounted on and moveable with carriage 39 and its attached components, or alternatively, may be mounted separately at the bracket-carriage assembly second position, it being only necessary for the operation of this invention that the unfilled product-free interior adjacent the open end of a just filled bag is in registration with the closure and clipping mechanism when it is clear of the stuffing horn outlet and its stopper.

When the bag closure apparatus is retracted to the FIG. 3 position, the filled bag is removed by rotatably tripping the package article support 43 about its pin journal 49. A fresh empty bag is then slipped over the stuffing horn outlet 15 and is pleated up on stuffing horn 13, the cylinder 53 is actuated to retract shaft 57 bringing the bracket-carriage assembly and its related components back into first position, the stopper and actuating rod are indexed to their first position and bag filling commences as illustrated in FIG. 1.

Apparatus as aforedescribed has been constructed and tested successfully in operations involving packaging of ground beef in cold rooms at or near freezing temperature 32°F. and plastic film bags which had heretofore been unsuitable were found completely suitable for such use.

The present invention will work equally well with practically all sorts of flexible packaging bags and tubing such as for instance those made of cellulosic films and those of thermoplastic films such as polyolefin, polyvinylchloride, and polyvinylidene chloride polymers or copolymers.

The location and the shape and size of the stopper 21 are also of some significance in that by securely cutting off product flow precisely at the stuffing horn outlet, any tendency to pull unwanted quantities of adherent product along with the advance of the desired bagged quantity is effectively eliminated.

The location and shape of the annular element 29 and its cooperative stuffing horn truncated conical section 17 are also significant in the invention in that these components coact to define passage 31, through which in passing in slipping movement the bag 11 is sized and trained from its random pleated up condition on stuffing horn 13 into condition for its advance along the stuffing horn outlet 15 and through the bag restraining element 33.

Thus the present invention provides solutions to a number of problems heretofore obtaining in cold room packaging of viscous product and makes for a significant advance in the art. Alternative embodiments and modes of practicing the invention, but within its spirit and scope, will, in the light of this disclosure, occur to persons conversant with the packaging arts. It is intended therefore that this description be taken as illustrative only and not construed in any limiting sense.

What is claimed is:

1. In apparatus for continually stuffing product into flexible packaging bags wherein the product is pressure fed into each bag sequentially through a stuffing horn disposed during stuffing into the bag through its open end and the bag filled to a preselected extent is closed at its neck and sealed, the improvement comprising, in combination, a. a stuffing horn outlet having a peripheral dimension less than the peripheral dimension of the stuffed bag;
   b. a truncated conical section disposed between and connecting the stuffing horn and the stuffing horn outlet;
   c. an annulus disposed concentrically on said truncated conical section arranged to define a truncated conical passage through which the bag being stuffed advances in slipping movement from the stuffing horn towards the stuffing horn outlet;
   d. product stoppering means disposed longitudinally concentrically in the stuffing horn, said product stoppering means having a first generally conical surface disposed in impinging relationship against product flow and a generally spherical surface disposed towards the direction of product flow, having a peripheral dimension not greater than the peripheral dimension of the stuffing horn outlet, reciprocally moveable between a first position in which product stuffing flow proceeds through the stuffing horn, the stuffing horn outlet, and around the stoppering means into the bag and a second position in which product stuffing flow is stopped at the stuffing horn outlet;
   e. means to move said stoppering means selectably between and into said first and said second positions;
   f. bag restraining means disposed concentrically of the stuffing horn adjacent the stuffing horn outlet arranged to hold the bag being stuffed in slipping contact against the stuffing horn outlet periphery;
   g. bracket means mounting the annulus, the bag restraining means, and a support for the bag being stuffed, and
   h. motive means operably connected to and arranged and disposed to move said bracket means reciprocally between a first position in which an unfilled product-free interior adjacent the open end of a just filled bag is in communication with the outer periphery of the stuffing horn outlet and a second position in which said unfilled product-free interior adjacent the open end of a just filled bag is advanced into registration with said bag neck closure and sealing means clear of the stuffing horn outlet and the product stoppering means.

2. Apparatus according to claim 1 wherein the bag neck closure and sealing means is disposed substantially concentrically of and between the annulus and the bag restraining means and is mounted on said bracket means to move therewith.

3. A method for continually making substantially alike package articles of viscous product snugly encased and sealed in flexible packaging bags comprising the steps of:

a. disposing a bag on a stuffing horn;
   b. stuffing the bag with product pressure fed through the stuffing horn at a stuffing flow cross sectional area less than the cross sectional area of the package article while permitting the bag as it fills with product to advance incompletely off the stuffing horn in slipping movement maintained against the stuffing horn periphery;

c. stopping the flow of pressure fed product into the bag before the bag is completely filled and while an unfilled product-free portion of the bag adjacent its open end is in communication with the stuffing horn;

d. advancing the bag clear of the stuffing horn to a position wherein its unfilled product-free portion adjacent its open end is in registration for bag neck closure and sealing;

e. closing the bag neck;

f. sealing the bag closed neck;

g. removing the package article, and h. repeating the steps (a) through (h).

* * * * *